No. 806,190. PATENTED DEC. 5, 1905.
R. E. ROSEWARNE.
VARIABLE SPEED MECHANISM.
APPLICATION FILED SEPT. 29, 1904.
3 SHEETS—SHEET 3.
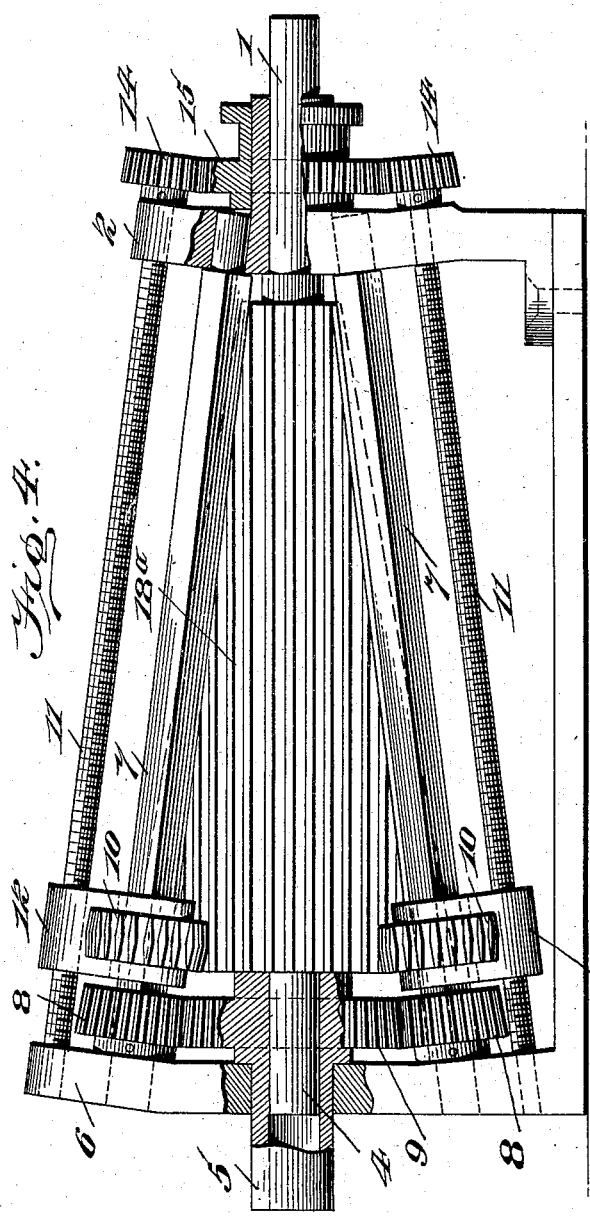
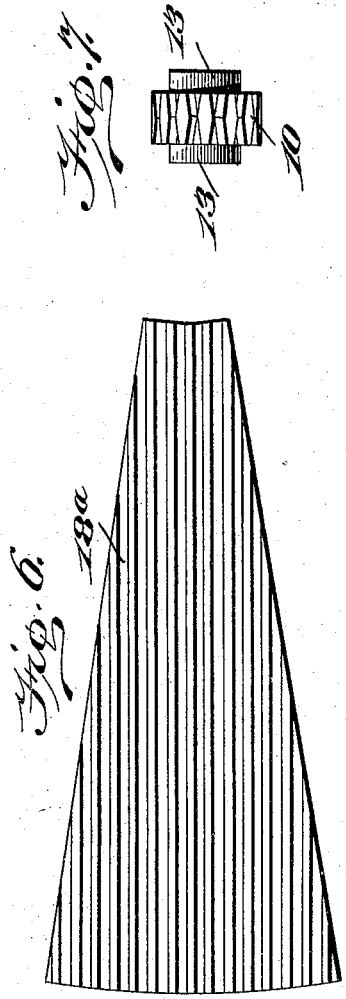
Witnesses
H. S. Dieterich
Harold ...
Inventor
Richard E. Rosewarne
By Knight Bros
Attorneys

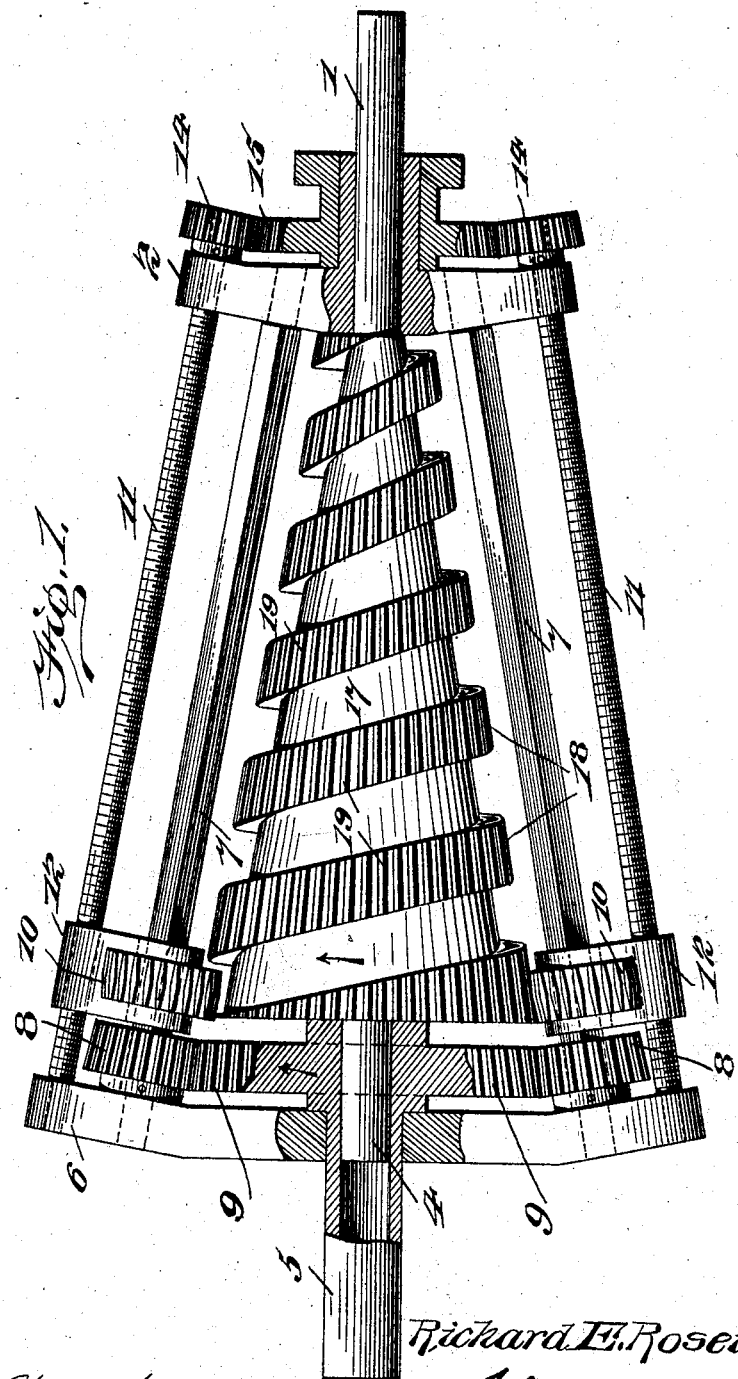

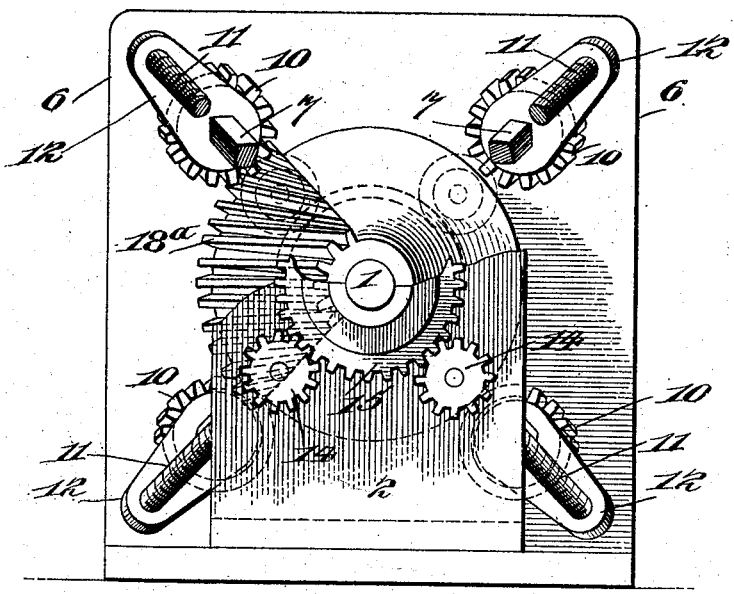

UNITED STATES PATENT OFFICE.

RICHARD E. ROSEWARNE, OF COVINGTON, KENTUCKY.

VARIABLE-SPEED MECHANISM.

No. 806,196. Specification of Letters Patent. Patented Dec. 5, 1905.

Application filed September 29, 1904. Serial No. 226,502.

*To all whom it may concern:*

Be it known that I, RICHARD E. ROSE-WARNE, a citizen of the United States, residing at Covington, in the county of Kenton and State of Kentucky, have invented certain new and useful Improvements in Variable-Speed Mechanisms, of which the following is a specification.

My invention relates to variable-speed mechanisms; and it has for its object to provide a mechanism of this kind in which any speed within two given points may be obtained and the driving connection between the parts will be positive.

Other objects and advantages will appear in the following description and will be particularly pointed out in the claims.

In the drawings, Figure 1 is a side view of one embodiment of my invention, partly in section. Fig. 2 is an end view of the embodiment shown in Fig. 1, parts being broken away. Fig. 3 is a detail view showing the shape of the conical spirally-interrupted gear if spread upon a flat surface. Fig. 4 is a side view of another embodiment of my invention, partly in section. Fig. 5 is an end view of the embodiment shown in Fig. 4. Fig. 6 is a detail view showing the shape of the mutilated gear shown in Fig. 4 if spread upon a flat surface, and Fig. 7 is a detail view of one of the pinions.

Referring more particularly to the drawings, 1 indicates a driving-shaft, which is journaled in a fixed bracket 2, and its free end 4 projects into and is journaled in a driven shaft 5, journaled in a fixed bracket 6. Journaled in and connecting the brackets 2 and 6 and surrounding the driving-shaft 1 are a number of shafts 7, each of which has rigidly secured thereto against relative axial and rotary movement a pinion 8, which meshes with a large gear 9 on the driven shaft. Also mounted on to turn with each of the shafts 7 is a slidable or shiftable pinion 10, the shaft 7 being non-circular throughout the greater portion of its length to provide for the sliding movement and prevent the relative rotary movement.

Each pinion 10 is shifted on its shaft 7 by means of a screw 11, journaled at each end in one of the brackets and working through a threaded yoke 12, which embraces the pinion 10 and in the arms of which the journals 13 are mounted.

The screws 11 of each of the pinions 10 are rotated in synchronism by means of pinions 14, one keyed to each screw and meshing with a gear 15, journaled on the bracket 2.

Secured to the driving-shaft 1 is a circumferentially-interrupted change-speed gear, which gradually decreases in circumference and number of teeth from one end to the other, being preferably mounted on a cone 17. In Figs. 1, 2, and 3 this varying gear comprises a conical spiral engaging portion 18, consisting of teeth 19, which gradually decrease in number, but are the same size in cross-section throughout the spiral to enable the pinions 10 to engage with them.

In the embodiment shown in Figs. 4, 5, and 6 the circumferentially-interrupted change-speed gear comprises an engaging portion 18$^a$ on an inclination extending throughout the length of the gear around a portion of its circumference and comprising teeth unbroken throughout their length.

In both embodiments the pinions 10 are movable on the shafts 7 in lines parallel with the engaging portions of the circumferentially-interrupted gears, and in Figs. 4, 5, and 6 are provided with teeth approximately diamond shape in plan view to conform to the angles of inclination of the engaging portions.

The operation of the invention is as follows: In the embodiment shown in Fig. 1, with the pinions 10 in the position there shown and the change-speed gear rotating in the direction of the arrow, it will be seen that the upper pinion 10 will be entering upon the engaging portion 18 before the lower pinion 10 leaves the same. Consequently there is always one of the pinions 10 in full engagement with the engaging portion 18, and as both of the pinions 10 are geared by pinions 8 to the large gear 9 this gear and the driven element 5 will be in constant rotation. By the adjustment shown the driven element 5 is given its greatest speed, and if it is desired to reduce this speed the gear 15 is rotated by any suitable means and all of the feed-screws are rotated to shift the pinions 10 over the mutilated change-speed gear, thereby securing a smaller driving circumference and number of teeth on the change-speed gear, and consequently reduced speed. Owing to the form of the change-speed gear in this embodiment, only two pinions 10 are required, and each pinion 10 while out of engagement is constantly rotated through its pinion 8 and thereby is always in position when engaging the change-speed gear again.

In the embodiment shown in Figs. 4, 5, and 6 the operation of the parts is identical with the operation of the parts shown in the first embodiment; but in this form, owing to the fact that the circumferentially-interrupted change-speed gear does not have the engaging portion around its entire circumference, a greater number of pinions 10, with their co-operating parts, are required.

The driving element need not be the shaft 1, inasmuch as the same result could be obtained by attaching the power to the shaft 5. Further, while teeth are preferred for the engaging portions of the different gears, owing to the positive driving connection thereby obtained, it is obvious that any other engaging surfaces may be employed.

While I have shown two embodiments of my invention in the annexed drawings, I desire it to be understood that I am not to be limited to the constructions here shown and that I may make any change in form, proportion, and minor details without departing from the spirit or sacrificing any of the advantages of my invention.

Having described my invention, what I claim is—

1. The combination with the driving element and the driven element, of a circumferentially-interrupted gear having an engaging portion of varying diameter and carried by one of said elements, and pinions for contact with the engaging portion movable along the periphery of said gear and connected with the other element.

2. The combination with the driving element, and the driven element, of a conical circumferentially-interrupted gear carried by one of the elements, and a plurality of devices for contact with the engaging portion of the gear connected with the other element and movable along the periphery of the gear.

3. The combination with the driving element, and the driven element, of a conical spirally-wound gear having teeth varying in number around the circumference of the same at different points in its length connected with one of said elements, and a pair of pinions for engagement with the gear, connected with the other element and movable along the periphery of the gear.

4. The combination with the driving element and the driven element, of a circumferentially-interrupted gear having an engaging portion of varying diameter, and connected to one of said elements, pinions for contact with the engaging portion of said gear, connected with the other element, and means for moving all of the pinions in synchronism along the periphery of the gear.

5. The combination with the driving element, and the driven element, of a conical circumferentially-interrupted gear carried by one of the elements, pinions for contact with the gear, connected with the other element, and means for moving the pinions along the periphery of the gear.

6. The combination with the driving element, and the driven element, of a conical circumferentially-interrupted gear carried by one of the elements, pinions for contact with the gear, connected with the other element, and means for moving all the pinions in synchronism along the periphery of the gear.

7. The combination with the driving element and the driven element, of a circumferentially-interrupted gear having an inclined engaging portion and carried by one of the elements, a plurality of pinions for contact with the engaging portion, a screw for each of said pinions, a pinion turning with each of the screws, and a gear-wheel common to all of the pinions on the screws.

8. The combination with the driving element and the driven element, of a circumferentially-interrupted gear having an engaging portion of varying diameter and carried by one of the elements, pinions for contact with the engaging portion, shafts on which the pinions are adapted to slide, and connections between the shafts and the other element.

9. The combination with the driving element and the driven element, of a circumferentially-interrupted gear having an engaging portion of varying diameter and carried by one of the elements, pinions for contact with the engaging portion, shafts on which the pinions are adapted to slide, and gearing connecting the shafts with the other element.

10. The combination with the driving element and the driven element, of a circumferentially-interrupted gear having an engaging portion of varying diameter and carried by one of the elements, pinions for contact with the engaging portion, shafts on which the pinions are adapted to slide, connections between the shaft and the other element, and means for moving all of the pinions on the shafts, in synchronism.

11. The combination with the driving element and the driven element, of a circumferentially-interrupted gear having an engaging portion of varying diameter and carried by one of the elements, pinions for contact with the engaging portion, shafts on which the pinions are adapted to slide, connections between the shaft and the other element, and a shifter to move each of the pinions along its shaft.

12. The combination with the driving element and the driven element, of a circumferentially-interrupted gear having an engaging portion of varying diameter and carried by one of the elements, pinions for contact with the engaging portion, shafts on which the pinions are adapted to slide, connections between the shaft and the other element, a shifter to each of the pinions, and means for operating all the shifters in synchronism.

13. The combination with the driving element and the driven element, of a circumferentially-interrupted gear having an inclined engaging portion and carried by one of the elements, a plurality of pinions for contact with the engaging portion, shafts on which the pinions are adapted to slide, connections between the shaft and the other element, a screw connected to each of the pinions, a pinion on each of the screws, and a single gear for moving all the pinions in synchronism.

14. The combination with the driving element and the driven element, of a circumferentially-interrupted gear having an engaging portion of varying diameter and carried by one of the elements, pinions for contact with the engaging portion, shafts on which the pinions are adapted to slide, a gear on the other element, a fixed pinion on each of the shafts meshing with the gear on the other element, a yoke for each of the sliding pinions, and a shifter for each of the yokes.

15. The combination with the driving element and the driven element, of a circumferentially-interrupted gear having an engaging portion of varying diameter and carried by one of the elements, pinions for contact with the engaging portion shafts on which the pinions are adapted to slide, a gear on the other element, a fixed pinion on each of the shafts meshing with the gear on the other element, a yoke for each of the sliding pinions, a shifter for each of the yokes, and means for operating all the shifters in synchronism.

16. The combination with the driving element and the driven element, of a circumferentially-interrupted gear having an inclined engaging portion and carried by one of the elements, a plurality of pinions for contact with the engaging portion, shafts on which the pinions are adapted to slide, a gear on the other element, a fixed pinion on each of the shafts meshing with the gear on the other element, a yoke for each of the sliding pinions, a screw for each of the yokes, a rigid pinion on each screw, and a gear with which all of the pinions on the screw mesh.

17. The combination with a toothed gear having a varying diameter, of toothed pinions shiftable along the periphery of the gear and adapted for engagement with the same and a driven member having connection with all of said pinions to be continuously driven thereby.

18. The combination with a circumferentially-interrupted conical gear, of a plurality of pinions adapted to travel on the conical gear in the same path and a driven member having connection with all of said pinions to be continuously driven thereby.

19. The combination with a circumferentially-interrupted conical gear, of a plurality of pinions adapted to travel on the conical gear in one circular path and a driven member having connection with all of said pinions to be continuously driven thereby.

20. The combination with a circumferentially-interrupted conical gear, of a plurality of pinions adapted to travel on the conical gear in one circular path, means for shifting the pinions to cause them to travel in other circular paths on the conical gear and a driven member having connection with all of said pinions to be continuously driven thereby.

The foregoing specification signed this 17th day of September, 1904.

RICHARD E. ROSEWARNE.

In presence of—
  FERDINAND BROERMAN,
  EDWIN H. FISHER.